Figure 4:
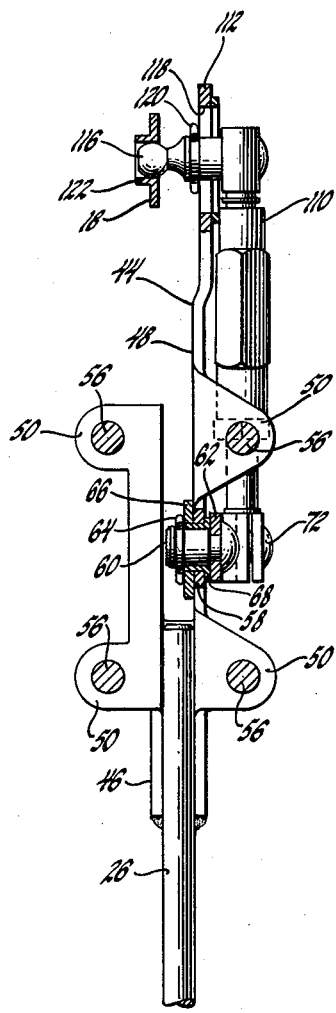

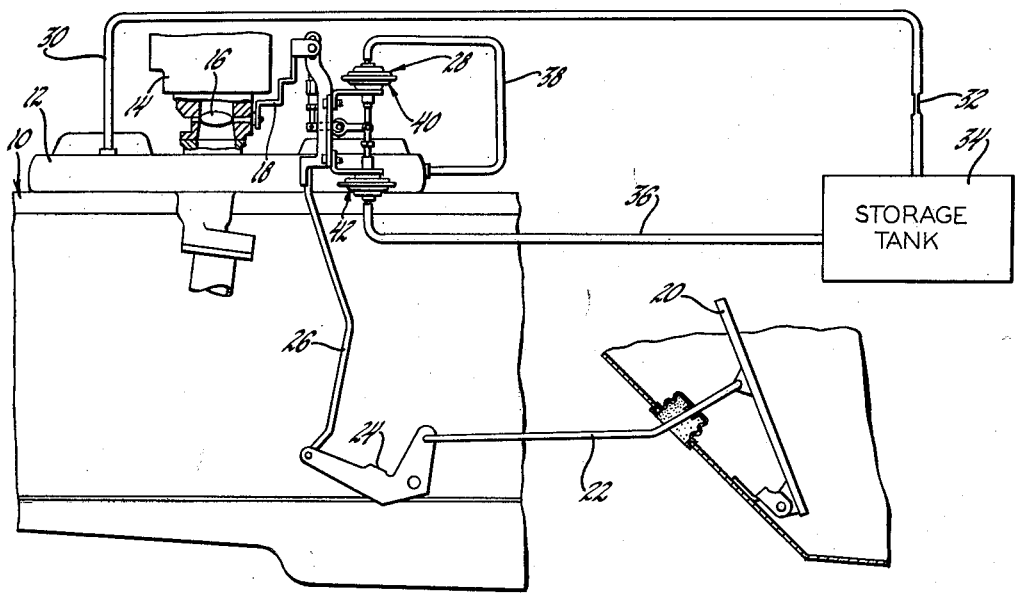
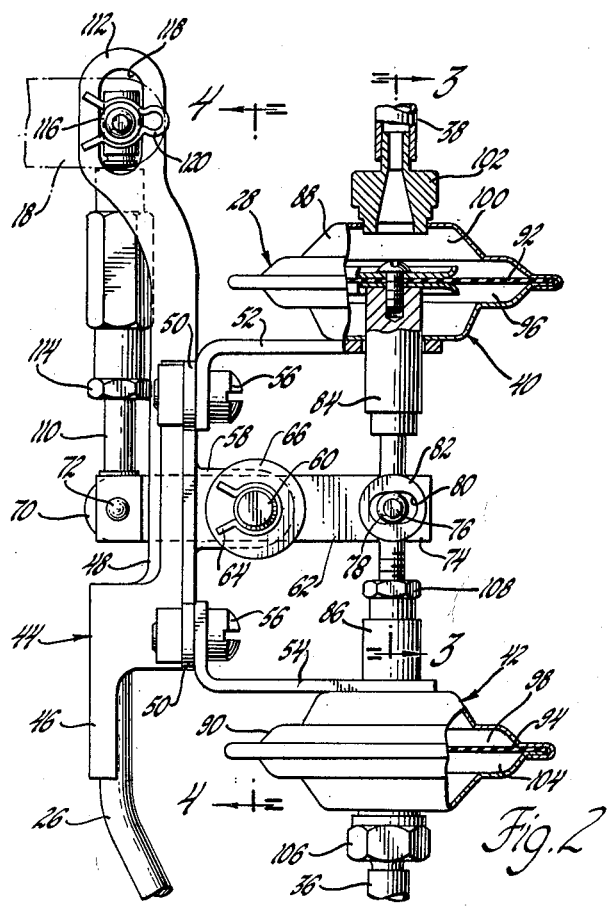
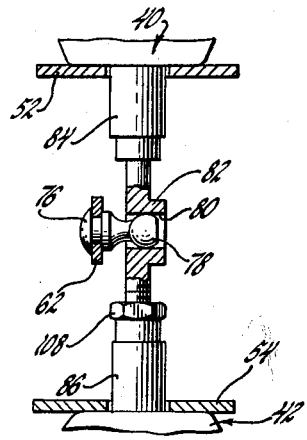

INVENTORS
Edgar C. Campbell,
BY & Fred F. Timpner

ATTORNEY

United States Patent Office 3,103,210
Patented Sept. 10, 1963

1

3,103,210
METHOD AND MECHANISM FOR CONTROLLING ENGINE TORSIONAL OSCILLATION
Edgar C. Campbell, Berkley, and Fred F. Timpner, Orchard Lake, Mich., assignors to General Motors Corporation, Detroit, Mich., a corporation of Delaware
Filed July 19, 1961, Ser. No. 125,134
7 Claims. (Cl. 123—103)

The invention relates to method and mechanism for controlling torsional oscillations set up in an internal combustion engine and more particularly to damp or prevent such oscillations so that very rapid engine speed changes are reduced to an acceptable level.

It has been found that the torsional oscillation of an engine has no integer relation to the mean engine speed but is the resonant frequency of the engine rotating inertia swinging against the load inertia through the flexibility of the drive line. This oscillation is particularly noticeable when torsion bar drive lines are utilized. It has also been found that, when torsional oscillations occur, the pressure variations in the intake manifold are reflected throughout the manifold with no appreciable time lag, giving a very stiff system with the instantaneous intake manifold pressure being essentially the same throughout the manifold at any given moment. It would be expected of a liquid that the pressure would be essentially the same at every point in a container at the same instant, but it has not been previously confirmed that the intake manifold of an internal combustion engine also acts in this manner, particularly at lower engine speeds where the gas velocities are well below the speed of sound. The pressure variations appear to take place at about the speed of sound, so that the maximum lag is only about one milli-second. For sensing purposes, the changes are therefore considered to be instantaneous.

The instantaneous intake manifold pressure changes instantly reflect the speed variations in the engine. Severe torsional oscillations result in very rapid and intense engine speed changes, imposing high stress loads on the entire engine drive line. As an extreme example, an engine which may be running at a nominal speed of 1200 r.p.m. may slow down to 700 r.p.m. and then rapidly speed up to 1700 r.p.m. all within one or two revolutions, with the instantaneous manifold pressure instantly reflecting those speed changes. Small speed changes are also known to occur which may create cyclic disturbances in the vehicle drive system. The manifold pressures, in combination with the variation in time available to charge a given cylinder on the engine, lead to unequal weight charges of fuel and air introduced into the engine combustion chambers. This in turn gives variable torque pulses. The variation in torque will follow the cyclic speed variation that initiated it. The engine will, therefore, tune in to any resonant frequency and excite it.

It is now proposed to overcome this excitation and, therefore, damp out the torsional oscillations by providing equal weight fuel-air charges even though rapid engine speed changes incipiently occur, thus preventing the oscillation build-up. This may be accomplished in accordance with the invention by sensing the instantaneous intake manifold pressure and the average intake manifold pressure, comparing the two, and moving the throttle valve controlling the air entering the intake manifold to balance the power output from each cylinder and prevent the excitation build-up. Mechanism embodying the invention includes diaphragm assemblies sensitive to instantaneous and average intake manifold pressures and interconnected with the throttle linkage to provide such a control. When large oscillations are prevented from being initiated, the engine will then not sustain an excitation.

2

The control is most effective when functioning very quickly so that it arrests the build-up process in the very early stages.

In the drawings:
FIGURE 1 is a schematic illustration of a system embodying the invention with parts broken away and in section;
FIGURE 2 is an enlarged view of the throttle valve oscillation mechanism of the system of FIGURE 1 with parts broken away and in section;
FIGURE 3 is a partial section view taken in the direction of arrows 3—3 of FIGURE 2 with parts broken away;
FIGURE 4 is a section view taken in the direction of arrows 4—4 of FIGURE 2 with parts broken away; and
FIGURE 5 contains three graphs illustrating changes in engine speed and manifold pressure at constant throttle and the changes in manifold pressure with a varying throttle, each plotted against time.

The overall system utilizing the method and mechanism embodying the invention is illustrated in FIGURE 1 as installed on the engine 10. The engine has the usual intake manifold 12 and carburetor 14 with a throttle valve 16. A throttle valve arm 18 is moved through appropriate throttle linkage to control the open position of the throttle valve. The throttle linkage includes the accelerator pedal 20, throttle rod 22, bell crank 24, throttle rod 26 and the throttle valve oscillation mechanism 28.

Intake manifold pressure is sampled through a conduit 30 so that it passes through a restrictive orifice 32 and into the storage tank 34. The pressure in tank 34, and therefore in conduit 36 leading therefrom, is the average intake manifold pressure of the engine. The instantaneous intake manifold pressure is sampled through conduit 38, which is directly connected to one side of the servo assembly 40 of mechanism 28. Conduit 36 is similarly connected to the servo assembly 42 of mechanism 28. This mechanism is shown in greater detail in FIGURES 2, 3 and 4.

Mechanism 28 includes a mounting link 44 secured to the throttle rod 26 and link end 46. The central section 48 of link 44 is offset from the line of throttle rod 26 and provided with mounting tabs 50 to which the brackets 52 and 54 are suitably mounted by bolts 56. A tab 58 extends from the link central section 48 intermediate the brackets 52 and 54 so as to receive the pivot pin 60 therethrough. A lever 62 is centrally pivoted on pin 60 underneath tab 58 and is held in place by the clip 64, washer 66 and bearing 68. One end 70 of link 62 extends underneath a portion of the link central section 48 and is provided with a pivot pin 72 having its axis perpendicular to and passing through the line of throttle rod 26 when lever 62 is normal to the direction of the throttle rod line. The other lever end 74 is provided with a pivot pin 76 having a ball end 78. The ball end is received in a slot 80 centrally formed in the yoke 82 which is connected at its opposite ends to the output rods 84 and 86 of the servo assemblies 40 and 42. The servo assembly housings 88 and 90 are respectively secured to the brackets 52 and 54 and have diaphragms 92 and 94 dividing the housings so that each housing has an atmospheric pressure chamber adjacent its mounting bracket. Thus, servo 40 has an atmospheric pressure chamber 96 adjacent bracket 52 and servo assembly 42 has its atmospheric pressure chamber 98 adjacent bracket 54. Chambers 96 and 98 are vented to the atmosphere by the openings through which rods 84 and 86 extend. Servo assembly 40 is also provided with an instantaneous intake manifold pressure chamber 100 on the other side of diaphragm 92 connected with conduit 38 through bushing 102. Rod 84 is suitably connected to the center of diaphragm 92 so that it moves as the diaphragm is moved under influence of differential pressure in chambers 96 and 100. Servo assembly 42 is provided with the average intake manifold pressure chamber 104 on the opposite side of diaphragm 94 from chamber 98 and is connected with conduit 36 through bushing 106. Rod 86 is connected to diaphragm 94 similar to the connection of rod 84 to diaphragm 82. The effective movement of yoke 82 is, therefore, responsive to the differential of the pressures in chambers 100 and 104. An adjusting mechanism 108 may be provided on one end of yoke 82 so that the position of lever 62 may be adjusted relative to the positions of diaphragms 92 and 94.

The throttle valve oscillating link 110 is pivotally attached to lever 62 by pivot pin 72 and extends along the line of throttle rod 26 generally parallel to link central section 48 and underneath the end 112 of mounting link 44. Link 110 may include an adjusting mechanism 114. A pivot pin 116 provided in the end of link 110 extending underneath link end 112 passes through the slot 118 formed in the link end 112 and is held in that slot by the clip 120. The end 122 of throttle valve arm 18 is pivotally attached to pin 116 so that movement of the throttle valve 16 is accomplished by movement of link 110 as lever 62 is pivoted about pivot pin 60 in response to movement of yoke 82 by servo assemblies 40 and 42. In addition, any linear movement of mounting link 44 by the vehicle operator through use of the accelerator pedal 20 is transmitted to the throttle valve to set the throttle at any desired opening in order to maintain the desired engine speed setting. It can thus be seen that pivotal movement of lever 62 will open or close throttle valve 16 from the throttle valve setting obtained through the accelerator pedal 20.

The servo assemblies 40 and 42 are so interconnected through their diaphragms 92 and 94 to the yoke 82 that the pressure in instantaneous intake manifold pressure chamber 100 works in opposition to the pressure in the average intake manifold pressure chamber 104. Therefore, when the absolute instantaneous intake manifold pressure in chamber 100 is higher than the average intake manifold pressure in chamber 104, throttle valve oscillating link 110 is moved to close the throttle valve 16 in relation to the throttle opening established by the position of the accelerator pedal 20; and when the absolute intake manifold pressure in chamber 104 is higher than the absolute instantaneous intake manifold pressure in chamber 100, link 110 is moved so as to open the throtle valve 16 in relation to the throttle opening established by the position of the accelerator pedal 20.

Figure 5:
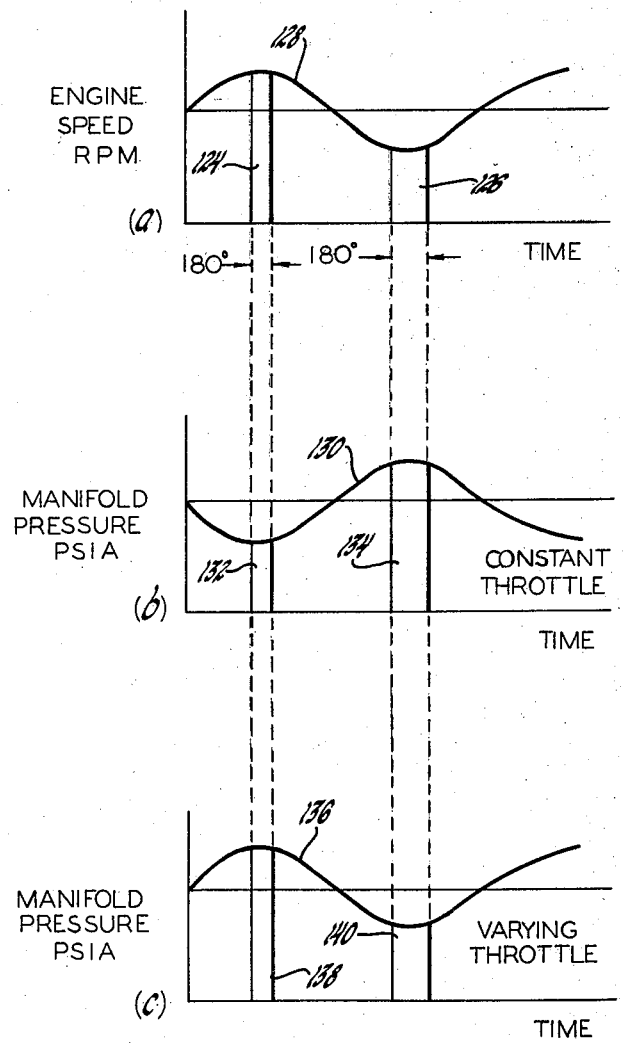

The graphs of FIGURE 5 aid in explaining the manner of operation of the system. Graph 5(a) is a plot of the engine speed against time and shows the oscillation of the speed with a constant throttle angle. The areas 124 and 126 under the speed-time curve 128 represent crank angle and, therefore, must be equal for the same degrees of crank angle. A crank angle of 180° is illustrated at opposite extremes of engine speed. The area 124 is, therefore, narrower and longer than the area 126 since the area 124 relates to the high point of the engine speed on curve 128 and area 126 relates to the low point of the engine speed on that curve. It takes more time for the crank angle to move through the 180° angular distance at the lower speed, thereby accounting for the difference in width of the two areas.

Graph 5(b) has a curve 130 which shows the oscillation of the absolute intake manifold pressure with a constant throttle opening during the same period of time plotted for graph 5(a). The areas 124 and 126, when projected to graph 5(b), also shows two areas 132 and 134. Areas 132 and 134 are proportional to the fuel-air charges to the engine cylinder or cylinders and, in turn, are proportional to the strength of the torque pulses resulting from the burning of the charges. If the torque pulses vary in magnitude according to the cyclic frequency, they will sustain and amplify the oscillation. It is clear that the torque pulses represented by areas 132 and 134 do this. This leads to a vicious circle in which the greater the amplitude of the oscillation, the greater will be the strength of the torsional excitation from the engine to drive the oscillation.

In order to damp and control the oscillation, one must either suppress the cyclic speed variation by reducing any disturbance to constant speed operation and/or damp any oscillations that exist, or prevent the build-up of the unequal fuel-air charges by which the engine can sustain the oscillation. The use of a viscous damper on a crankshaft and a dashpot in the throttle linkage to prevent sudden changes in load will serve to accomplish the first result to a satisfactory extent. The second and more desirable result, in that it removes the source of self-excitation, may be obtained by method and mechanism embodying the invention. This causes the instantaneous absolute manifold pressure to vary as shown in graph 5(c) by curve 136. This pressure is now in reverse to the engine speed changes instead of in phase with them as is the pressure of graph 5(b). Equal areas 138 and 140 are now provided instead of the unequal areas 132 and 134, indicating that equal fuel-air charges are provided irrespective of the oscillation. Equal torque impulses will then be obtained, and the engine speed changes will decrease. The self-excited torsional oscillations are, therefore, stopped before they can get started and build up to an undesirable extent.

While the best results are obtainable when areas 138 and 140 are equal, satisfactory operating conditions may also be found as these areas approach but do not obtain absolute equality from the widely different areas 132 and 134 of graph 5(b). Following this conclusion, it has been found that oscillation of the throttle valve at some frequency other than the natural torsional frequency of the engine drive line assemblies will lessen the torsional oscillations even though the torsional oscillations then change to agree in frequency with the oscillation frequency of the throttle valve. This decrease in amplitude of torsional oscillation of the engine is in full accord with the theoretical response of the vibrating system to a forcing excitation. Thus, in some instances satisfactory results may be obtained by using oscillators which operate at frequencies other than the natural torsional operation frequency of the engine and drive line assembly. Such oscillators may be of the type disclosed, or controlled and driven by other means. They may, for example, be electromagnetic oscillators or oscillators driven by a portion of the drive line. In such installations they would practice the method herein disclosed and claimed.

We claim:

1. A method of damping internal combustion engine torsional oscillations comprising the steps of simultaneously sampling and comparing instantaneous engine intake manifold pressure and average engine intake manifold pressure and moving the throttle valve in one direction when the instantaneous pressure is higher than the average pressure and moving the throttle valve in the other direction when the average pressure is higher than the instantaneous pressure.

2. A method of damping internal combustion engine torsional oscillations comprising the steps of simultaneously sampling and comparing instantaneous engine intake manifold pressure and average engine intake manifold pressure and moving the throttle valve in the closing direction when the instantaneous pressure is higher than the average pressure and moving the throttle valve in the opening direction when the average pressure is higher than the instantaneous pressure.

3. Mechanism for damping internal combustion engine torsional oscillations in an internal combustion engine having a throttle valve and throttle valve control linkage and an intake manifold, said mechanism comprising a first servo responsive to instantaneous intake manifold pressure, a second servo responsive to average intake manifold pressure, and common servo output means interconnecting said servos and connected to the throttle valve control linkage to move the throttle valve under influence of said servos, said first servo acting to urge the throttle valve in the closed direction upon an increase in absolute instantaneous intake manifold pressure, and said second servo acting to urge the throttle valve in the open direction upon a decrease in absolute average intake manifold pressure.

4. Internal combustion engine throttle valve control means comprising throttle linkage for moving the throttle valve and including a throttle valve oscillating mechanism mounting link and a throttle valve control arm and throttle valve oscillating mechanism mounted on said link, said mechanism including first means responsive to instantaneous intake manifold pressure and second means responsive to average intake manifold pressure, said first and second means having a common output member and a lever pivoted on said link and operatively connected to said control arm and said output member, said first and second means acting through said common member and said lever and said control arm to move the throttle valve toward the closed position when the instantaneous intake manifold pressure is greater than the average intake manifold pressure and to move the throttle valve toward the open position when the average intake manifold pressure is greater than the instantaneous intake manifold pressure.

5. In an internal combustion engine having a throttle valve and an intake manifold, throttle valve control linkage connected with said throttle valve to establish a base throttle valve opening and means responsive to the differential between instantaneous intake manifold pressure and average intake manifold pressure to move said throttle valve from the base throttle valve opening toward the closed throttle valve position when the instantaneous intake manifold pressure is greater than the average intake manifold pressure and toward the open throttle valve position when the average intake manifold pressure is greater than the instantaneous intake manifold pressure.

6. A system for damping internal combustion engine torsional oscillations comprising an engine throttle valve, an engine intake manifold having the fuel-air entry thereto controlled by said throttle valve and subject to instantaneous changes in manifold pressure, first means establishing and sensing an average intake manifold pressure value, second means sensing instantaneous intake manifold pressure values, and an output for said first and second means responsive to the differential between the sensed pressures and connected with said throttle valve to move said throttle valve in accordance with that differential in opposite directions to maintain a substantially constant weight fuel-air charge to each of the engine cylinders.

7. An internal combustion engine control system for preventing self-exciting torsional oscillations and comprising, an intake manifold having a changing instantaneous intake manifold pressure therein instantly reflective of engine speed changes throughout a torsional oscillation and normally in opposite phase with the engine speed changes, means connected with said intake manifold and establishing an average intake manifold pressure, a throttle valve controlling the entry of fuel and air into said manifold and therefore controlling intake manifold pressure, a throttle valve control linkage connected with said throttle valve and operable to set said throttle valve to a desired opening, oscillation means interposed in said throttle valve control linkage for moving said throttle valve in opposite directions from the set desired opening and comprising a first servo assembly sensing instantaneous intake manifold pressure from said intake manifold and a second servo assembly sensing average intake manifold pressure from said average intake manifold pressure establishing means and reciprocating linkage actuated by the differential of the sensed pressures acting through said first and second servo assemblies and forming a part of said throttle valve control linkage to move said throttle valve in opposite directions from the set desired opening whereby absolute instantaneous intake manifold pressure is controlled to increase and decrease in phase with incipient engine speed oscillating changes to prevent self-exciting torsional oscillations.

References Cited in the file of this patent
UNITED STATES PATENTS

| | | |
|---|---|---|
| 2,505,292 | Mallory | Apr. 25, 1950 |
| 2,588,136 | Mallory | Mar. 4, 1952 |
| 2,837,074 | Ransom | June 3, 1958 |